Figure 1:
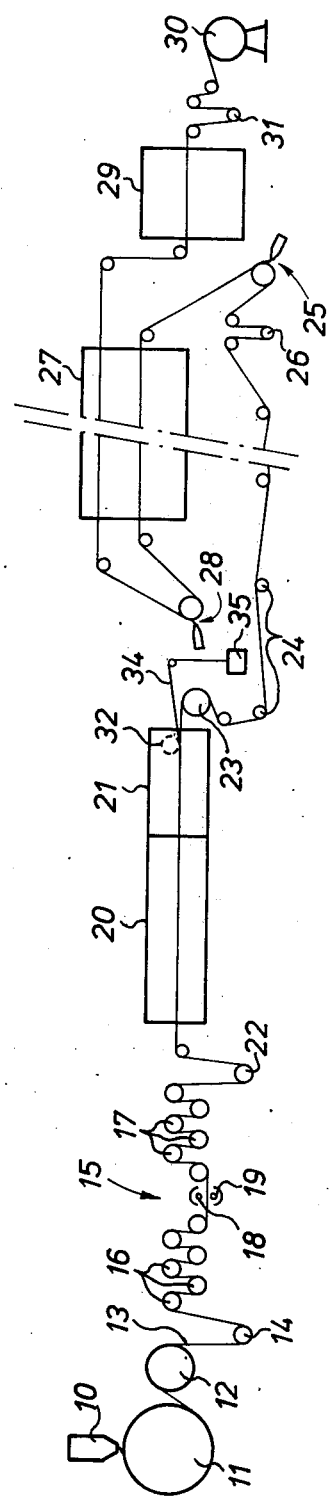

United States Patent [19]

De Smedt et al.

[11] 4,140,740
[45] Feb. 20, 1979

[54] FLATNESS CONTROL OF THERMOPLASTIC FILM

[75] Inventors: Felix F. De Smedt, Edegem; Charles A. Gilles, Mortsel, both of Belgium

[73] Assignee: AGFA-GEVAERT N.V., Mortsel, Belgium

[21] Appl. No.: 787,051

[22] Filed: Apr. 13, 1977

[30] Foreign Application Priority Data

Apr. 15, 1976 [GB] United Kingdom ............ 15602/76

[51] Int. Cl.² .................................................. B29D 7/24
[52] U.S. Cl. .................................. 264/146; 264/171; 264/210 R; 264/289; 264/342 RE; 264/345; 428/910
[58] Field of Search ............... 264/288, 342 RE, 289, 264/342 R, 290 R, 345, 290 T, 210 R, 40.1, 40.7, 145–146, 171; 428/910; 260/75 T

[56] References Cited

U.S. PATENT DOCUMENTS

| | | | |
|---|---|---|---|
| 2,002,711 | 5/1935 | Parkhurst et al. | 264/289 |
| 2,779,684 | 1/1957 | Alles | 264/289 |
| 2,968,067 | 1/1961 | Long | 264/289 |
| 3,329,756 | 7/1967 | Seeley | 264/288 |
| 3,663,683 | 5/1972 | Czerkas et al. | 264/289 |
| 3,873,664 | 3/1975 | Curtis et al. | 264/289 |

*Primary Examiner*—Jeffery R. Thurlow
*Attorney, Agent, or Firm*—William J. Daniel

[57] ABSTRACT

A method for the production of biaxially molecularly oriented polymeric film, wherein the flatness of the film is improved by subjecting the film preferably immediately after its heat-setting to a longitudinal tension that is at least three times higher than the normal film transport tension in the production process. Preferably, said higher longitudinal tension is at least 100 kp/sq.cm. The film may be subjected also between its longitudinal stretching and its heat-setting to said at least three times higher longitudinal tension. The temperature of the film during said treatment at increased longitudinal tension is between room temperature and the second order transition temperature of the film.

14 Claims, 3 Drawing Figures

FLATNESS CONTROL OF THERMOPLASTIC FILM

The present invention relates to a method for the production of biaxially molecularly oriented polymeric film with improved flatness.

A great many linear, synthetic, organic polymers such as polyethylene terephthalate, are capable of being transformed into translucent or transparent films having excellent physical properties. Some of these properties e.g. tensile strength, impact strength and flexural strength can be further improved by molecular orientation. For instance, a polyethylene terephthalate film that has been stretched biaxially, for instance stretched in two directions perpendicular to each other, is a material offering many possibilities of industrial application owing to its excellent physical properties. When such oriented films are submitted to a heat treatment at high temperatures, say above 100° C., they show a high degree of dimensional stability and tensile strength at elevated temperatures up to the temperature of heat treatment.

In the customary process for the production of a biaxially oriented crystallizable, thermoplastic, organic polymer film, such as a polyethylene terephthalate film, the polymer is extruded as a molten film on a quenching drum where it is rapidly cooled to be in a substantially amorphous state, and the quenched film is stretched longitudinally (that is in the direction of extrusion) to the desired extent between rollers rotating at different speeds. Thereafter the film is stretched transversely in a transverse stretching device comprising jaws for engaging the film edges and making them follow diverging paths. After biaxial stretching, the film is passed in a heat setting station which is maintained at a temperature which is within a range of 25° C. above the second order transition temperature and below the crystalline melting temperature range of the film and wherein the dimensions of the film are held substantially constant. The mentioned heat setting of the film improves the dimensional stability of the film at temperatures above the temperatures of biaxial stretching, while at the same time considerably increasing the crystallinity of the film.

Finally, the film is passed through a heat relaxing zone which is maintained at a temperature which is slightly above that in the transverse stretching zone, and wherein the film is maintained under only a slight longitudinal tension to still further improve the dimensional stability of the film. An additional advantage of the heat relaxing of a film is the improvement of the overall flatness of the manufactured film.

The factors influencing the overall flatness of a manufactured film are not known with any degree of certainty because the film may become less flat in an unpredictable fashion, even when it appears that all of the important processing conditions are being maintained practically constant. Possible causes of unflatness may be different orientation, thickness, rates of heating or cooling, etc.

The occurrence of less flat film may give rise to considerable production losses, especially in the production of graphic film, that is light-sensitive photographic material used for graphic reproduction purposes, but it may also lead to complete interruptions of a production process in those cases where, prior to the heat relaxing of the film, one or more layers are being coated on the film by means of modern coaters that are closely spaced from the film, such as cascade or extrusion coaters so that, even if the film is sufficiently flat upon leaving the heat relaxing station, its insufficient flatness at the passage of the coating station may cause a rupturing of the coating bead or a soiling of the lips of the coater owing to contact of the film with the coater.

The present invention aims to provide a method for improving the flatness of a film, independent from, or as the case may be, in addition to, the heat relaxing of a film, whereby the mentioned difficulties may be overcome.

In accordance with the present invention, a method for continuously producing molecularly oriented heat set polymer film, comprises the steps of:

extruding a linear organic, crystallizable polymer to form a molten layer and quenching said layer to obtain a substantially amorphous film, biaxially molecularly orienting said film by longitudinally and transversely stretching the film at a film temperature between the second order transition temperature of the polymer and about 50° C. above said transition temperature, heat setting the oriented film by heating the film to a temperature within a range of about 25° C. above the second order transition temperature to below the crystalline melting temperature range of the film while restricting dimensional change of the film, and subjecting the oriented film prior to its collection to a high longitudinal tension, i.e. a tension which is at least three times a normal film transport tension between the stretching stations and the winding station, while the film is at a temperature between room temperature and the second order transition temperature of the film.

As normal film transport tensions according to the gist of the present invention, we consider a tension between 10 and 25 kp/sq.cm.

Preferred but optional features of the invention are as follows:

The biaxial stretching of the film occurs by first longitudinally and thereafter transversely stretching the film. This has the two following advantages. First, the device for longitudinally stretching the film may have a width which is considerably smaller than the width of such device if it were disposed behind the device for transversely stretching the film.

The same advantage applies also to a coating installation which may be provided between both stretching devices in order to apply a subbing or other layer to the film. Second, the operations of transverse stretching and of heat setting the film may be carried out in direct succession by means of one jaw-and-chain tenter mechanism which comprises two series of jaws which first grip both margins of the film and make them follow diverging paths to transversely stretch the film, and then follow parallel paths through a zone where the required processing temperature is maintained to heat set the film.

The film is subjected to a said high longitudinal tension immediately after its heat setting and cooling. For example, such a high tension may be applied between the exit end of the tenter of the heat setting station and a film pull roller disposed behind said station, the heat setting station functioning to constrain the film against forward advance to permit the inducement therein of the required longitudinal tension by the film pull roller. Such high tension may for example be at least five times a normal film transport tension.

A preferred high longitudinal tension for the film, particularly if it is applied after the heat setting of the film, is as least 100 kp/sq.cm, and a still more preferred tension is not less than 180 kp/sq.cm.

The values for the longitudinal film tension mentioned hereinbefore and also subsequently throughout the description of the present specification, are the quotient resulting from the amount of the pulling force exerted on the film divided by the cross sectional area of the film.

In case the pulling force is established by a dancer roller, said pulling force is determined by the mass of the dancer roller increased, as the case may be, by any biasing of the roller.

Since in a conventional installation for the production of a biaxially molecularly oriented, heat set and heat released polymer film, there are usually several dancer rollers provided at several places in order to control the film tension and the proper film transport at such places, it will be understood that the present invention can be carried out merely by increasing the masses of iron, lead or other material that determine the biasing force of a particular dancer roller.

In case the mentioned pulling force is established by one or more driven rollers about which the film is angularly wrapped in order to obtain the desired pulling, the pulling force may be measured by means of transducers mounted between the roller bearings and the machine frame, said transducers providing an electric output signal as a function of their distortion under the influence of the film tension. An alternative method for measuring the film pulling force in such case, is to measure the electric current in the supply circuit of the motor(s) driving such rollers.

Still further optional features of the invention are as follows.

The film is subjected to said high longitudinal tension immediately after its longitudinal stretching. A preferred high longitudinal tension for the film in such case is as least 60 kp/sq.cm and a still more preferred tension is not less than 100 kp/sq.cm. During such tension the temperature of the film is preferably in the range of 25 to 45° C.

The film is twice subjected to the high longitudinal tension, namely a first time between its longitudinal and transverse stretching, and a second time after its heat setting subsequent to its transverse stretching.

The film is heat relaxed prior to its winding. The time during which the film is subjected to high longitudinal tension in accordance with the present invention is not critical, and may vary between 1 second or even less, to periods covering some tens of seconds.

Figure 2:
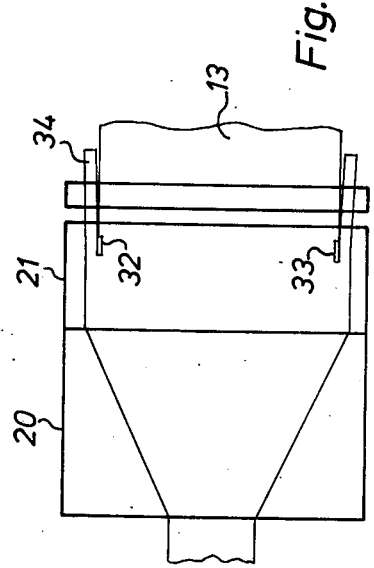
Figure 3:
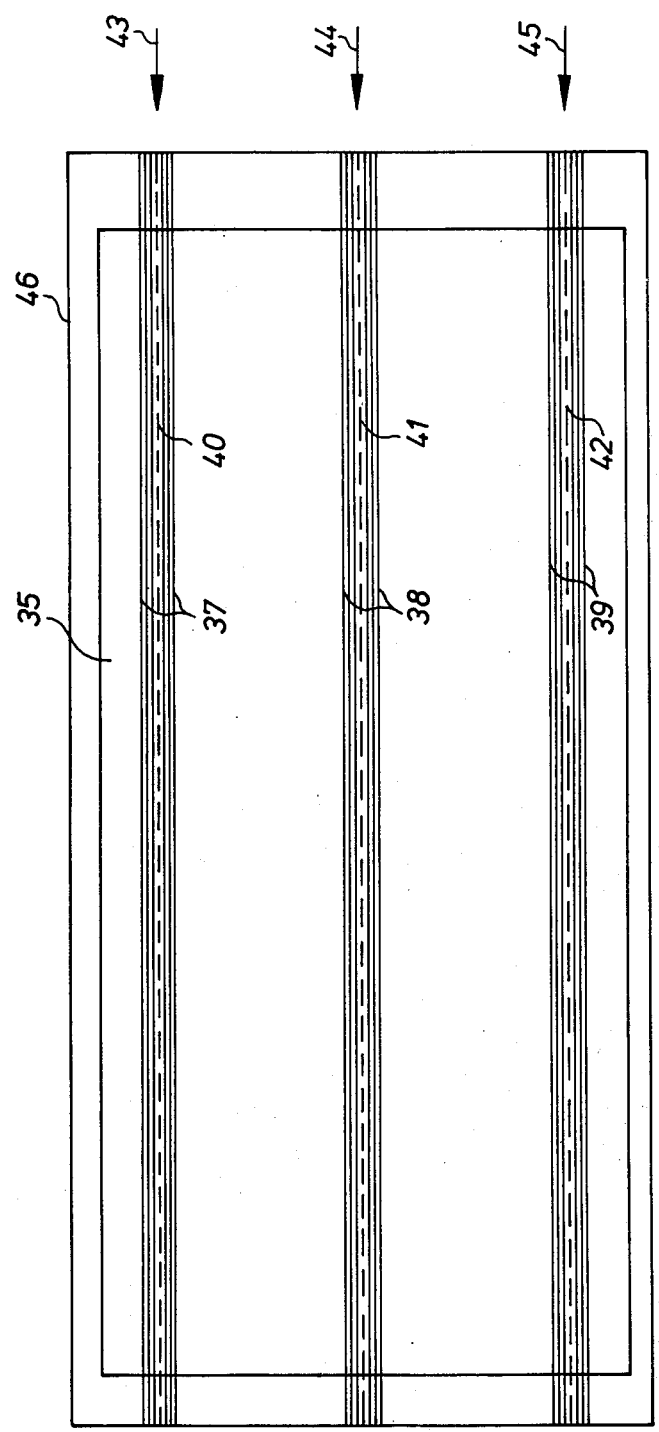

The invention will now be described by way of example with reference to the accompanying drawings wherein:

FIG. 1 is a diagrammatic illustration of an installation for carrying out the method according to the present invention, FIG. 2 is a diagrammatic top view of the transverse stretching and of the heat setting station of the installation of FIG. 1, and FIG. 3 is a diagrammatic view illustrating the measurement of the flatness of a strip of film.

Referring to FIG. 1, a molten thermoplastic film forming polymeric material is extruded through an extrusion die 10 as a molten film curtain onto driven quenching drums 11 and 12. The function of the quenching drums is to sufficiently rapidly lower the temperature of the film to below the second order transition temperature of the polymer, so that the solidified film 13 is in a substantially amorphous state as it leaves the quenching drum 12. A dancer roller 14, which is in fact a free vertically movable roller which, by its vertical position, controls the motor means (not shown) driving the rollers downstream of its position, determines the longitudinal film tension by its means, and as the case may be by means of ballast masses added thereto.

The film is longitudinally molecularly oriented by means of a longitudinal stretcher 15 which comprises a series of slowly driven, heated rollers 16, a series of rapidly driven, cooled rollers 17, and two rod-like IR-heaters 18 and 19 for heating the film to a temperature above the second order transition temperature of the polymer.

The film is thereafter transversely molecularly oriented in a transverse stretcher 20 where the film edges are gripped by a plurality of successive jaws which are made to follow diverging paths thereby to increase the width of the film while the film is being heated to a temperature above the second order transition temperature. In a heat setting station 21 the jaws remain engaged with the film edges while following, however, parallel paths, thereby to constrain the film against lateral shrinkage while the film is being heated to a temperature within a range of 25° C. above the second order transition temperature of the film and below the crystalline melting temperature range of the film, in order to heat stabilise the film.

A dancer roller 22 determines the film tension between the longitudinal and the transverse stretcher.

Upon leaving the heat setting station 21, the film is engaged by a driven so-called vacuum roller 23 which, in accordance with the invention, is so adjusted that an increased pull is carried out on the film. A vacuum roller is, as known in the art, a roller with a perforated mantle over a certain angular extent of which there may be established a vacuum at the innerside of the roller by means of an appropriately shaped and sealed member which is stationarily disposed within the roller.

The film 13 is conveyed over a number of idler rollers 24 to a first coating station 25, where a first subbing layer is applied to the film, the film tension being controlled by a dancer roller 26. The film web 13 is then conveyed through a drying section 27, next transported through a second coating station 28, where the film web is provided at its opposite side with a subbing layer, and thereupon the film web is passed again through the drying section 27.

Finally, the film is heat relaxed in the station 29, and wound onto a roll 30 at a longitudinal tension which is determined by the dancer roller 31. The means within the heat relaxing station 29 for keeping the film at a reduced longitudinal tension are known in the art and have therefore not been shown in the drawing.

As the film leaves the heat setting station 21, the margins of the film are trimmed by rotatable circular blades 32 and 33, so that a smooth flat film which is free of wrinkled and corrugated margins as a consequence of the gripping by the jaws, is obtained. The trimmed marginal film bands, such as the band 34 shown, are conveyed to a collector such as 35.

The following tests illustrate the improvements attainable by the invention.

A polyethylene terephthalate polymer having an inherent viscosity of 0.57 dl.g$^{-1}$ is extruded at a rate of 750 kg.h$^{-1}$ and at a temperature of 290° C. through a conventional flat extrusion die having an orifice of 535 × 2.5 mm. The molten polymer is received on the quenching drums 11 and 12 which are driven at a rate of 10 m.min$^{-1}$. The film temperature amounts to about 50° C. as the film leaves the drum 12.

The film is stretched longitudinally to a ratio of 3.8 and while at a temperature of 92° C. The film is stretched transversely to a ratio of 3.8 while at a temperature of 95° C., and heat set at a temperature of 220° C. for 2 seconds.

The film receives thereafter a subbing layer at both its surfaces by means of an appropriate coating installation, for instance an extrusion or a cascade coater. Finally the film is heat relaxed at a longitudinal tension of 10 kp/sq.cm and while at a temperature of 130° C. for a period of 30 seconds.

In a first test, the production of the film occurred under the following conditions. Film tension established by the roller 14: 4.5 kp/sq.cm, by the roller 22: 20 kp/sq.cm, by the roller 23: 24 kp/sq.cm, by the roller 26: 27 kp/sq.cm and by the roller 31: 24 kp/sq.cm. The film was not heat relaxed.

A second test occurred under the same working conditions, but in addition the film was heat relaxed.

In a third test the film was subjected by the roller 23 to an increased longitudinal tension of 250 kp/sq.cm. During said increased longitudinal tensioning, the film had a temperature of 40° C. The final film was not heat relaxed.

In a fourth test, the film was treated according to the conditions of the third test, except for the fact that the film was now heat relaxed.

In a fifth test, the film was subjected to an increased longitudinal tension after its longitudinal stretching, of 140 kp/sq.cm by increasing the mass of the roller 22. This tensioning occurred at a temperature of approximately 40° C. The film was not heat relaxed.

In a sixth test, the film was treated according to the fifth test, except for the fact that the film was now heat relaxed.

In a seventh test, the film was subjected to the increased longitudinal tensions of the third and fifth tests, without heat relaxing.

Finally, in an eighth test, the film was treated according to the seventh test, except for the fact that the film was now heat relaxed.

The following table summarizes the different conditions of the eight tests, and the measured flatness of the film.

Table

| Test | Increased longitudinal tension | | Heat relaxing | Flatness | | |
|---|---|---|---|---|---|---|
| | after TS | after LS | | L | M | R |
| 1 | no | no | no | −6 | 6 | 6 |
| 2 | no | no | yes | 4 | 2 | 4 |
| 3 | yes | no | no | 6 | 6 | 6 |
| 4 | yes | no | yes | 2 | 2 | 2 |
| 5 | no | yes | no | 6 | 6 | 6 |
| 6 | no | yes | yes | 2 | 2 | 2 |
| 7 | yes | yes | no | 5 | 5 | 5 |
| 8 | yes | yes | yes | +2 | 2 | 2 |

The flatness of the film is expressed by three figures which stand for the left side (L), the middle (M) and the right side (R) of the film respectively. A sign (−) indicates that the flatness is slightly less good whereas a sign (+) indicates that the flatness is slightly better than the mentioned figure. The notions TS and LS stand for transverse and longitudinal stretching.

The measurement of the flatness of the film occurred as follows. A film strip 35, in the present case a strip of a length of about 5 meters, was cut from a material roll and put on a horizontal flat table 46, see FIG. 3. The table 46 has a white smooth top surface which is provided with three groups 37, 38 and 39 of each ten equally spaced black lines (ten lines per group) only some of which have been illustrated in the figure. The lines of each group are spaced from each other over about 1 cm. The group of lines 38 is drawn centrally of the table whereas the lateral position of the groups 37 and 39 is such that they are situated at a distance of approximately 20 cm from the corresponding film edges. Above the table and running parallel therewith, there are provided three elongate light sources (not illustrated) that are partially masked to produce each a line of light of a width of about 5 mm. The projected lines of light on the table are illustrated by the broken lines 40, 41 and 42. The table is further provided with a plurality of small bores (not illustrated) so that a length of film which is laid on the table may readily assume a more or less flat position after the air has escaped from its lower surface. If now an inspector looks onto the film at three positions indicated by the arrows 43, 44 and 45, then he will notice that the projected lines of light 40, 41 and 42 are no longer straight but, on the contrary, will show a capricious course, which is determined by the distortion of the images of the line light sources in dependence of the lack of flatness of the film. The measurement results are simply the number of lines of one group that are counted by the inspector between the peak to peak deviations of the corresponding projected line of light.

It appears from the table that the results of tests 4, 6 and 8 are very good, and it may be concluded therefrom that the combination of at least one increased longitudinal tensioning of the film with the step of heat relaxing yields a well flat film. In practice, this was a film which was extremely suited as a support in the production of graphic film, since the support for this type of film has to undergo in any way the step of heat relaxing in order to improve the dimensional stability of the film. The improvement of the flatness by the heat relaxing of the film must be considered as a favourable side effect of this operation.

If no heat relaxing was carried out, as in the case of a support for the production of X-ray film, then it may be seen on said table that a quotation −6,6,6 is obtained if no increased longitudinal tension in accordance with the invention is applied. Although the flatness of such film may still be acceptable for film for radiographic purposes, difficulties may occur if such film is being coated by means of modern coating systems as mentioned in the introduction of the specification. It may be seen from the results of tests 3 and 5 that the application of one increased longitudinal tension already very slightly improves the flatness of the film, whereas if the film is subjected in two distinct stages to the increased longitudinal tension according to the invention, see test 7, a more markedly improvement of the flatness may be noticed.

It will be understood that a film web being made in accordance with the method according to the present invention may undergo other treatments then disclosed in the embodiment described hereinbefore.

The film may be electrostatically pinned to the quenching drum or drums in order to improve its surface quality and/or accelerating its quenching. The film edge may be knurled before the film is wound in order to prevent telescoping deformation of the wound film rolls during the manipulations thereof.

The film may be provided with a subbing layer, or with a first subbing layer in those cases wherein a substratum layer is composed of two distinct subbing layers, between its longitudinal and transverse stretching, with the advantage mentioned in the introduction of the specification.

The film may be subjected to an intermediate corona discharge treatment for improving the adhesion of its surface(s) for a subbing layer or other layer.

The means for trimming the margins of the film after the heat setting may be so disposed with respect to the exit of the heat setting station 21 that the margins of the film are severed from the film at a point which is upstream of the point where the forces operative to restrict dimensional change of the film cease to exist. In practice, this means that the trimming blades such as 32 and 33 are situated on the film path at a point before the point where the jaws which grip the film edges are opened to release the film. In doing so, the margins of the film are cut from the film before they are released by the jaws, and thus said margins are free from any stress in the transverse direction at their releasing by the jaws so that the disengagement of the jaws may occur without any problem.

Finally, the method of the present invention is suitable for use in the production of film from polymers other than polyethylene terephthalate which lend themselves to biaxial molecular orientation and heat setting. Some of these polymers are polyvinylidene chloride and copolymers thereof, polyamides, polystyrene and its copolymers, polycarbonates, etc.

We claim:

1. Method for continuously producing molecularly oriented heat set polymer film, comprising the steps of
   extruding a linear organic, crystallizable thermoplastic polymer to form a molten layer and quenching said layer to obtain a substantially amorphous film,
   biaxially molecularly orienting said film by longitudinally and transversely stretching the film at a film temperature between the second order transition temperature of the polymer and about 50° C. above said transition temperature,
   heat setting the oriented film by heating the film to a temperature within a range of about 25° C. above the second order transition temperature to below the crystalline melting temperature range of the film while restricting dimensional change of the oriented film, and
   prior to collection, subjecting the oriented film to a high longitudinal tension of at least 100 kp/sq.cm. without permanent stretching of the film while the film is at a temperature between room temperature and the second order transition temperature of the film.

2. Method according to claim 1, wherein the film is subjected to a said high longitudinal tension after being heat set but before its collection, and wherein said tension is at least five times a normal film transport tension.

3. Method according to claim 1, wherein the film is heat relaxed before being collected.

4. Method according to claim 1, wherein said high tension is not smaller than 180 kp/sq.cm.

5. Method according to claim 1, wherein said film has a temperature within the range of 20 to 60° C. during the application of a said high longitudinal tension.

6. Method according to claim 1, wherein a said high longitudinal tension is applied to the film immediately after the heat setting of the film.

7. Method according to claim 6, wherein the margins of the film are severed from the film web at a point on the film travelling path which is upstream of the point where the forces which are operative to restrict dimensional change of the film during the heat stabilization of the film, cease to exist.

8. Method according to claim 1, wherein the film is subjected to a said high longitudinal tension between its longitudinal stretching and its heat setting.

9. Method according to claim 1, wherein at least one layer is coated onto the film between the increased longitudinal tensioning of the film and the winding of the film.

10. Method according to claim 1, wherein said polymeric film is a polyethylene terephthalate film.

11. Method according to claim 8, wherein the film has a temperature within the range of 25 to 45° C. during the application of such high longitudinal tension.

12. Method according to claim 8, wherein such high longitudinal tension is applied to the film immediately after its longitudinal stretching.

13. Method according to claim 1, wherein the molecular orientation of the film occurs first in the longitudinal and thereafter in the transverse direction.

14. Method according to claim 1, wherein said oriented film is subjected to two separate stages of longitudinal tensioning of at least 100 kp/sq.cm. before collection.

* * * * *